(12) United States Patent
Chen et al.

(10) Patent No.: US 12,540,929 B2
(45) Date of Patent: Feb. 3, 2026

(54) DESALTING SYSTEM FOR CHROMATOGRAPHY

(71) Applicant: Dionex Corporation, Sunnyvale, CA (US)

(72) Inventors: Yongjing Chen, Sunnyvale, CA (US); Yan Liu, Palo Alto, CA (US)

(73) Assignee: Dionex Corporation, Sunnyvale, CA (US)

( * ) Notice: Subject to any disclaimer, the term of this patent is extended or adjusted under 35 U.S.C. 154(b) by 979 days.

(21) Appl. No.: 17/553,956

(22) Filed: Dec. 17, 2021

(65) Prior Publication Data

US 2023/0194485 A1 Jun. 22, 2023

(51) Int. Cl.
*G01N 30/86* (2006.01)
*G01N 30/72* (2006.01)
*G01N 30/32* (2006.01)

(52) U.S. Cl.
CPC ......... *G01N 30/8675* (2013.01); *G01N 30/72* (2013.01); *G01N 2030/326* (2013.01); *G01N 2030/328* (2013.01)

(58) Field of Classification Search
CPC ...... B01D 15/24; B01D 15/367; B01D 15/36; G01N 30/8675; G01N 30/72; G01N 30/96; G01N 30/14; G01N 30/64; G01N 30/86; G01N 30/26; G01N 2030/326; G01N 2030/328; G01N 2030/645
(Continued)

(56) References Cited

U.S. PATENT DOCUMENTS 5,801,302 A 9/1998 Riviello
9,914,651 B2 3/2018 Srinivasan et al.
(Continued)

FOREIGN PATENT DOCUMENTS

CN 217443260 U 9/2022
JP 2006-145382 A 6/2006
(Continued)

OTHER PUBLICATIONS

Valentín-Blasini, et al., "Quantification of iodide and sodium-iodide symporter inhibitors in human urine using ion chromatography tandem mass spectrometry", Journal of Chromatography A, vol. 1155, No. 1, pp. 40-46, 2007.
(Continued)

*Primary Examiner* — Akash K Varma
(74) *Attorney, Agent, or Firm* — BakerHostetler

(57) ABSTRACT

An analytical system comprises a chromatography column configured to separate a sample into one or more analytes; an ion removal device configured to remove at least ions of one charge from the mobile phase, the ion removal device fluidly coupled to an output of the chromatography column; an ion selective sensor configured to measure a signal corresponding to an activity of the ions of one charge in the mobile phase, the ion selective sensor fluidly coupled to an output of the ion removal device; an optional diverter valve that can interrupt the flow of the mobile phase; and a microprocessor configured to monitor the signal of the ion selective sensor and to either switch the optional diverter valve to interrupt the flow of the mobile phase or turn off the pump when the signal is greater than a predetermined threshold.

12 Claims, 17 Drawing Sheets

(58) Field of Classification Search
USPC .......................................................... 210/656
See application file for complete search history.

(56) References Cited

U.S. PATENT DOCUMENTS

| | | | |
|---|---|---|---|
| 10,605,793 B2 | 3/2020 | Kannan et al. | |
| 2014/0332387 A1* | 11/2014 | Srinivasan | B01J 49/30 204/632 |
| 2018/0024101 A1* | 1/2018 | Srinivasan | G01N 30/8668 73/1.02 |
| 2019/0128860 A1* | 5/2019 | Furukawa | G01N 30/88 |
| 2020/0264144 A1* | 8/2020 | Jayaraman | B01J 39/05 |
| 2022/0155265 A1* | 5/2022 | Sakamoto | B01D 15/426 |

FOREIGN PATENT DOCUMENTS

| | | |
|---|---|---|
| JP | 4945770 B2 | 6/2012 |
| WO | 2021/140686 A1 | 7/2021 |

OTHER PUBLICATIONS

Hsu, "Interfacing ion chromatography with particle beam mass spectrometry for the determination of organic anionic compounds", Analytical Chemistry, vol. 64, No. 4, pp. 434-443, Feb. 15, 1992.

Bruggink et al. "Oligosaccharide analysis by capillary-scale high-pH anion-exchange chromatography with on-line ion-trap mass spectrometry," Journal of Chromatography B, Dec. 2005, vol. 829, Issues 1-2, No. 27, pp. 136-143.

Lopez et al. "Analysis of Carbohydrates and Lipids in Microalgal Biomass with HPAE-MS and LC-MS," Thermo Fisher White Pages 70495, 2016, 6 pages.

Szabo et al. "Instrument configuration for native N-linked oligosaccharide characterization by HPAE-PAD/MS," Thermoscientific Technical Note 72478, 2017, 14 pages.

* cited by examiner

DESALTING SYSTEM FOR CHROMATOGRAPHY

BACKGROUND

High-performance anion exchange chromatography coupled with pulsed amperometric detection (HPAE-PAD) permits direct quantification of non-derivatized carbohydrates with high sensitivity and minimal sample preparation. It has been shown that HPAE offers superior resolution of oligosaccharides compared to other chromatographic techniques, such as hydrophilic interaction chromatography (HILIC). When HPAE is coupled to a mass spectrometer (MS), it provides faster and more reliable identification and peak confirmation. More importantly, it can be used to elucidate complex oligosaccharide structures. One area of particular interest is glycan analysis, which has grown rapidly as a result of increasing use of biopharmaceutical products. Another area of importance is characterization of prebiotics and other oligosaccharides and polysaccharides in food and nutrition research, where HPAE-PAD has already been an established technique in profiling the oligosaccharides and polysaccharides, and HPAE-MS can offer a more in-depth characterization.

Interfacing HPAE and MS is a technological challenge. Typical alkali acetate and hydroxide eluents used in separation of oligosaccharides are not compatible with electrospray ionization (ESI) used in a mass spectrometer, due to their non-volatility and high conductance, therefore, a desalting device is required between the column and the ESI-MS.

The desalter (suppressor) employs a sandwich structure where two cation exchange membranes separating three channels. The central channel is the eluent channel while the flanking side channels are regenerate channels. Electrolysis of water occurs in the regenerate channels to generate hydronium ions passing the cation exchange membranes to continuously exchange the alkali cations in the eluent, converting the alkali hydroxide and acetate into water and acetic acid, which is volatile and compatible with ESI-MS. The performance of the desalter can be affected by a number of factors. The cation exchange membranes can be contaminated with sample matrix or contaminant precipitation causing ineffective ion exchange with lower desalting efficiency. The regenerant channels can be depleted of liquid due to regenerant bottle runout, causing regeneration to fail. The desalter can leak and fail due to high backpressure caused by clogging downstream. When the desalter is not functioning properly, the nonvolatile alkali acetate and hydroxide eluents can break through and result in instability of ESI, causing ionization suppression, extensive peak tailing, and complicated mass spectra. When continuous flow of the nonvolatile salts reaches the ESI probe, it can cause a buildup of salt deposits in the ESI source, which requires maintenance therefore extended system downtime.

BRIEF SUMMARY

An analytical system comprises a pump configured to pump a mobile phase; an injection valve configured to input a sample into the mobile phase, the injection valve is fluidly coupled to an output of the pump; a chromatography column configured to separate the sample into one or more analytes, the chromatography column fluidly coupled to an output of the injection valve; an ion removal device configured to remove at least ions of one charge from the mobile phase, the ion removal device fluidly coupled to an output of the chromatography column; an ion selective sensor configured to measure a signal corresponding to an activity of the ions of one charge in the mobile phase, the ion selective sensor fluidly coupled to an output of the ion removal device; an optional diverter valve that can interrupt the flow of the mobile phase; and a microprocessor configured to monitor the signal of the ion selective sensor and to either switch the optional diverter valve to interrupt the flow of the mobile phase or turn off the pump when the signal is greater than a predetermined threshold.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

The eluent used in some separations contains non-volatile salt which is not compatible with electrospray ionization-mass spectrometry (ESI-MS). Examples include alkali acetate and hydroxide eluents used in separation of oligosaccharides. A suppressor is required to convert the non-volatile salt into water or the volatile acid form (e.g. acetic acid). When the suppressor fails, the non-volatile salts will enter the MS and cause it to be shut down and require extensive service of the mass spectrometer. The described system and method provides a way of detecting when the suppressor has failed which will allow intervention to prevent damage to the MS.

In some embodiments, an analytical system comprises a pump configured to pump a mobile phase; an injection valve configured to input a sample into the mobile phase, the injection valve is fluidly coupled to an output of the pump; a chromatography column configured to separate the sample into one or more analytes, the chromatography column fluidly coupled to an output of the injection valve; an ion removal device configured to remove at least ions of one charge from the mobile phase, the ion removal device fluidly coupled to an output of the chromatography column; an ion selective sensor configured to measure a signal corresponding to an activity of the ions of one charge in the mobile phase, the ion selective sensor fluidly coupled to an output of the ion removal device; an optional diverter valve that can interrupt the flow of the mobile phase; and a microprocessor configured to monitor the signal of the ion selective sensor and to either switch the optional diverter valve to interrupt the flow of the mobile phase or turn off the pump when the signal is greater than a predetermined threshold.

Figure 1:
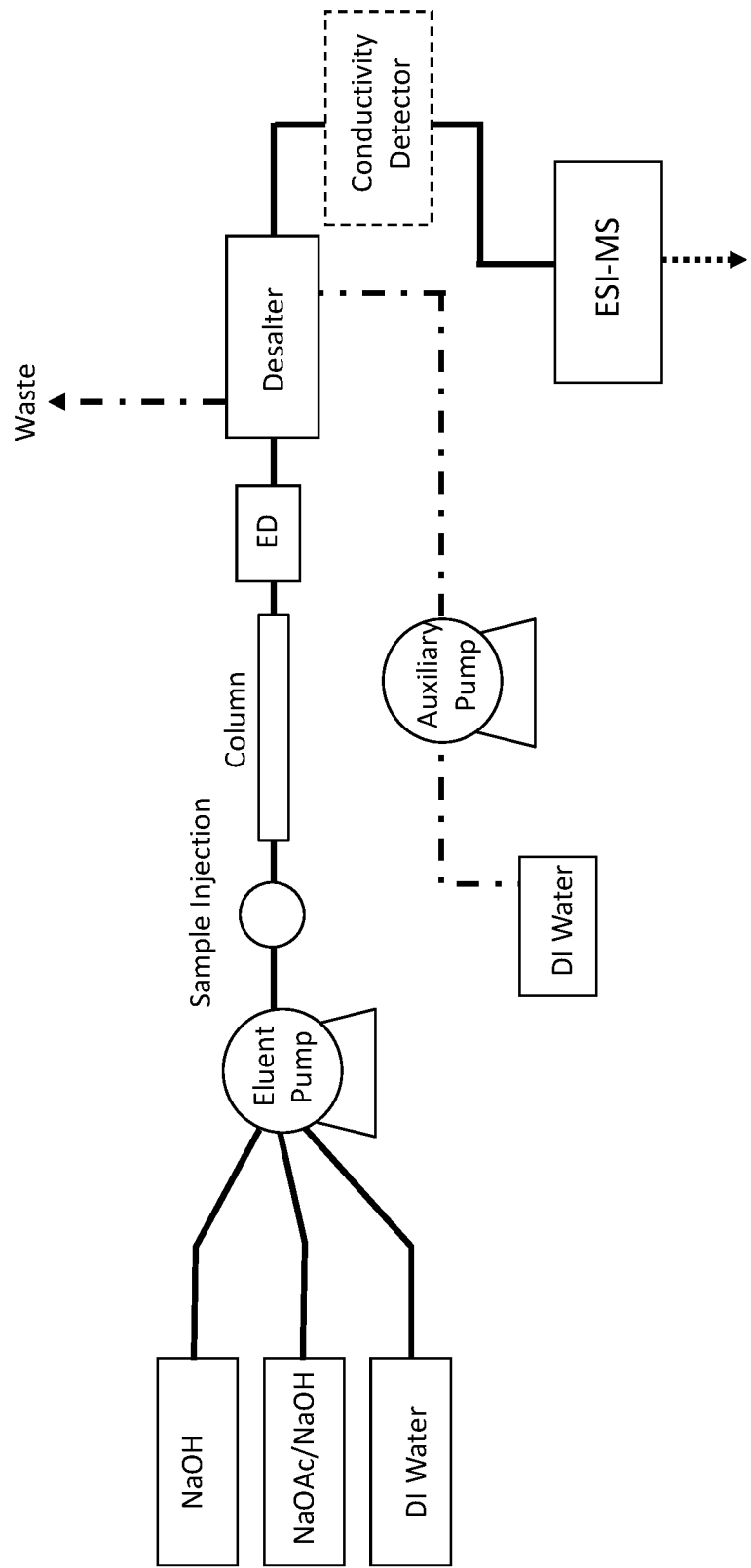
FIG. 1 is a schematic diagram of a typical HPAE-PAD/MS system.

The eluent condition used for separation of oligosaccharides typically comprises an alkali acetate (e.g. up to 200-400 mM NaOAc) gradient in constant alkali hydroxide (typically 100 mM NaOH). FIG. 1 shows a schematic diagram of a typical HPAE-PAD/MS system. The column outlet is connected to an electrochemical cell for PAD followed by an electrolytically regenerated desalter (Thermo Fisher Scientific). A conductivity detector can be connected at the outlet of the desalter to monitor the conductivity of the effluent before it enters the MS. However, the conductivity reading doesn't provide the information on the accurate composition of the effluent, which is a mixture of acetic acid and alkali acetate solution of varied concentration. Therefore, the conductivity signal fails to effectively provide an indication whether the desalter is working properly or not (FIG. 1 and Example 1). The described device offers a real-time monitor of the effluent with an effective indication.

Figure 2:
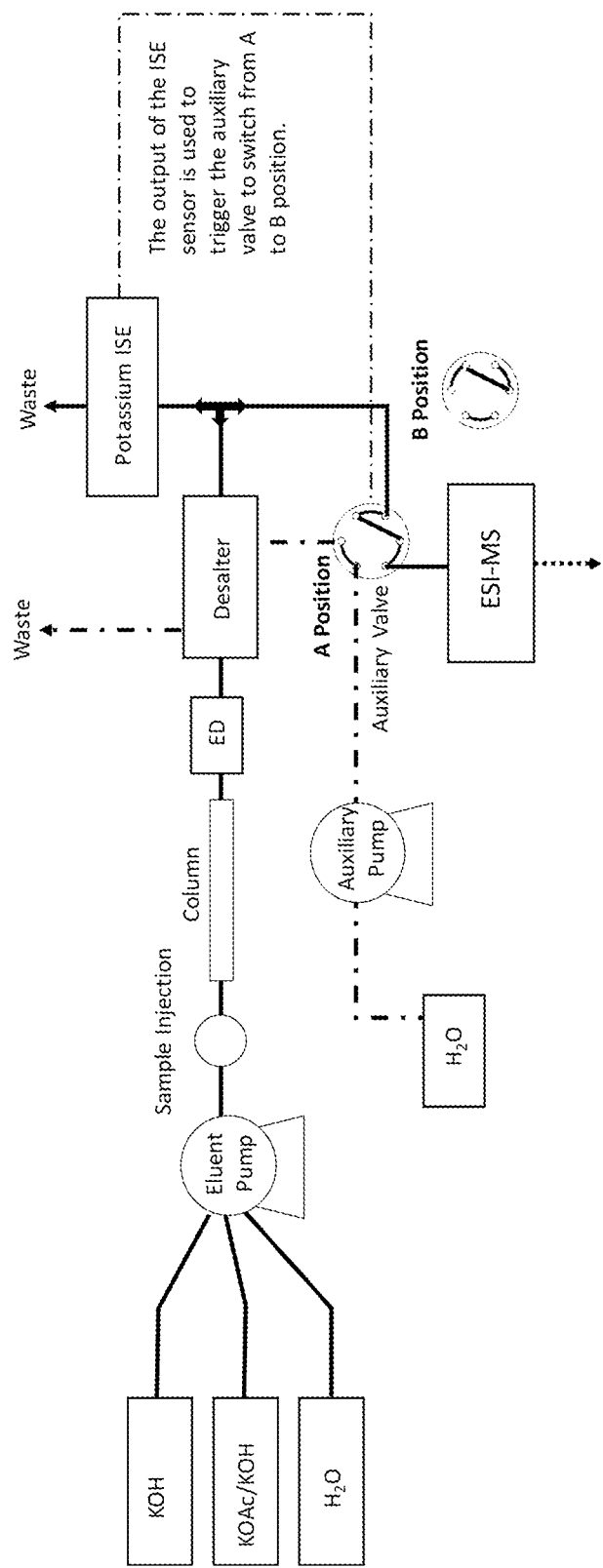
FIG. 2 is a schematic diagram of an embodiment.

Examples of ion removal devices (desalter) include suppressors. For self-regenerated suppressors, constant current is applied to the electrodes to cause the water electrolysis for continuous supply of hydrogen or hydroxide ions for the eluent suppression. A suppressor can be designed to remove ions of a single charge or ions of both positive and negative charges. In some embodiments, the ion removal device is configured to remove only ions of a single charge. In some embodiments, the ion removal device is configured to remove ions of both charges. Ions to be removed are typically eluent counterions. In some embodiments, the ions of one charge is selected from the group consisting of lithium, sodium, potassium, cesium, and rubidium An ion selective sensor is configured to measure a signal corresponding to an activity of the ions of one charge in the mobile phase. Examples of an ion selective sensor include an ion selective electrode (ISE) and a pH sensor. In some embodiments, the ion selected sensor detects an increase in salt concentration of the effluent of the ion removal device. A combination ion selective electrode (ISE) of the alkali cation in the eluent may be housed in a flow cell. The ISE continuously monitors the alkali cation concentration of the effluent. The output potential of ISE is proportional to the concentration of the selected ion in solution. In some embodiments, the output of the ISE can be used to trigger a diverter valve to switch valve positions when the electrode response exceeds a set value, preventing the non-volatile eluents from entering the mass spectrometer. For instance, a potassium electrode can accurately detect millimolar level of potassium ions at pH>2. In some embodiments, the ion selective sensor is a potassium electrode and the signal corresponds to a potassium activity value, wherein the predetermined threshold corresponds to the potassium activity value of 0.1 mM to 0.35 M (FIG. 2). Examples of the predetermined threshold include 0.1 mM to 0.2 mM, 0.2 mM to 0.3 mM, 0.3 mM to 0.4 mM, 0.4 mM to 0.5 mM, 0.5 mM to 0.6 mM, 0.6 mM to 0.7 mM, 0.7 mM to 0.8 mM, 0.8 mM to 0.9 mM, 0.9 mM to 1 mM, 1 mM to 1.25 mM, 1.25 mM to 1.5 mM, 1.5 mM to 1.75 mM, 1.75 mM to 2 mM, 2 mM to 5 mM, 5 mM to 10 mM, 10 mM to 15 mM, 15 mM to 20 mM, 20 mM to 25 mM, 25 mM to 50 mM, 50 mM to 75 mM, 75 mM to 100 mM, 100 mM to 125 mM, 125 mM to 150 mM, 150 mM to 175 mM, 175 mM to 200 mM, 200 mM to 225 mM, 225 mM to 250 mM, 250 mM to 275 mM, 275 mM to 300 mM, 300 mM to 325 mM, 325 mM to 350 mM. In some embodiments the threshold is 1.75 mM. In some embodiments, the output of the ISE can be used to turn off the pump to prevent the non-volatile eluents from entering the mass spectrometer. The data show that the change of potassium concentration in the range of interest in the presence of acetic acid is well detectable by the ISE (Example 2). In some embodiments, the ion selective sensor comprises a solid state electrode and the ion selective sensor does not leach an ion exchange reagent.

Figure 3:
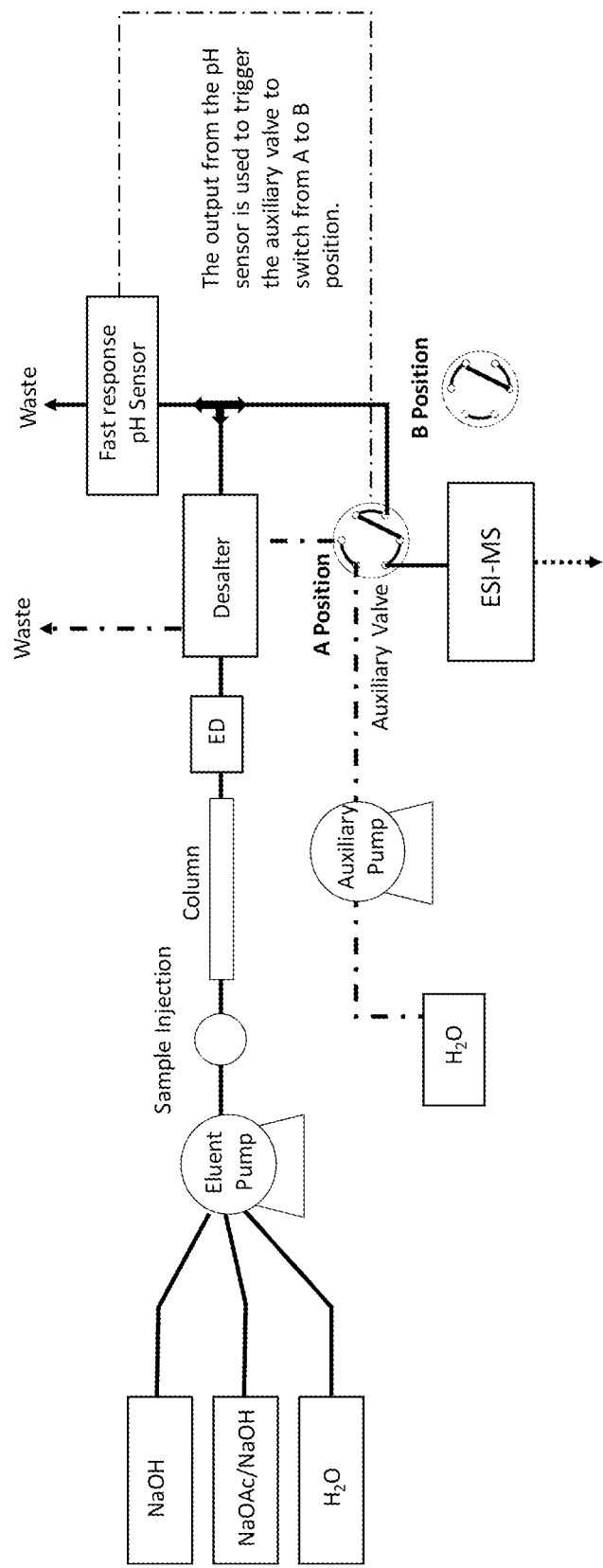
FIG. 3 is a schematic diagram of an embodiment.

In some embodiments, the ion selective sensor is a is a hydronium electrode (a pH sensor, FIG. 3). When the desalter works properly, the pH of the effluent is in the range of 2-3. When the desalter fails to convert >99% of the alkali acetate and alkali hydroxide to acetic acid and water, increasing amount of alkali ions will be present in the effluent, resulting in an increasing concentration of alkali acetate, which in turn, leads to an increase of pH. The change of pH is discernable by a pH sensor, which can be used as an indication of the status of the desalter (Example 3). Since the pH of the flow is acidic, the pH sensor is not subjected to any interference from alkali ions (e.g. sodium ion) and can offer reliable measurements. Under the normal operating condition, the effluent from the desalter continuously flows into the MS, while the pH sensor continuously monitor the pH of the effluent. The pH reading provides an indication about the status of the system. In some embodiments, the output of the pH sensor is used as a mechanism to trigger a diverter valve to switch valve positions when the pH exceeds a set value, preventing the non-volatile eluents from entering the mass spectrometer. In some embodiments, the predetermined threshold is selected from a pH value between the range of 2-4, such as 2, 2.5, 3, 3.5, and 4. The flow path to the MS is closed and the flow path to the waste is opened so the effluent that contains salt will not be directed into the MS. When the desalter fails to convert >99% of the alkali acetate and alkali hydroxide to acetic acid and water, the reading of the pH sensor turns to greater than 3. In some embodiments, the output of the pH sensor can be used to turn off the pump to prevent the non-volatile eluents from entering the mass spectrometer.

In some embodiments, the ion selective sensor comprises an ion selective flow cell. The ion selective flow cell has a flow cell inlet and a flow cell outlet. The ion selective flow cell contains the ion selective sensor, the flow cell inlet is fluidly coupled to the outlet of the ion removal device.

In some embodiments, a diverter valve can interrupt the flow of the mobile phase when the ion selective sensor detects a signal that is greater than a predetermined threshold. The diverter valve has a first valve inlet, a first valve outlet, and a second valve outlet. The diverter valve having a first state and a second state. The first valve inlet is fluidly coupled to the first valve outlet and not fluidly coupled to the second valve outlet in the first valve state. The first valve inlet is fluidly coupled to the second valve outlet and not fluidly coupled to the first valve outlet in the second valve state. The diverter valve is upstream from the MS. It may be directly upstream from the MS or prior to the ion selective sensor or prior to the ion removal device. The diverter valve can interrupt the flow of the mobile phase and replace it with a different liquid, such as water by switching from the first state to the second state. In some embodiments, the second outlet of the first splitting device is fluidly coupled to the first valve inlet of the diverter valve. In some embodiments, either the first or second valve outlet of the diverter valve is fluidly connected to a mass spectrometer.

A microprocessor is configured to monitor the signal of the ion selective sensor and to either switch the optional diverter valve to interrupt the flow of the mobile phase or turn off the pump when the signal is greater than a predetermined threshold. This prevents the mobile phase which contains too many ions from entering the MS.

In some embodiments, at the outlet of the desalter, the flow is split using a first splitting device, such as a micro-tee. The first splitting device comprises a first inlet, a first outlet, and a second outlet. The first inlet is fluidly coupled to each of the first outlet and the second outlet, the first inlet also is fluidly coupled to the ion removal device. The first outlet of the splitting device is connected to an ion selective sensor, such as a combination ion selective electrode (ISE) of the alkali cation in the eluent that is housed in a flow cell or a pH sensor. In some embodiments, the second outlet of the splitting device is connected to a diverter valve, which is then connected to the MS. The valve is normally open to the MS and normally closed to the flow path to waste. Under the normal operating condition, the effluent from the desalter continuously flows into the MS, while the ion selective sensor continuously monitors the alkali cation concentration of the effluent. Because the function of the desalter is to exchange the alkali cations in the eluent for hydronium ions, the presence of the alkali cations with increasing concentration is an indication that the desalter is failing. As the output potential of the ion selective sensor is proportional to the concentration of the selected ion in solution, the output of the ion selective sensor can be used to trigger the diverter valve to switch valve positions when the electrode response exceeds the set value, preventing the non-volatile eluents from entering the mass spectrometer. For instance, a potassium electrode can accurately detect millimolar level of potassium ions at pH>2. The data show that the change of potassium concentration in the range of interest in the presence of acetic acid is well detectable by the ISE (Example 2). The ratio of the flow rate through the MS and the ISE can be adjusted through backpressure tubing. The length of the connection between the outlet of the desalter and the inlet of the MS doesn't have to be changed dramatically to accommodate an additional micro-tee and the diverter valve, so the setup will not cause much dispersion.

Figure 7:
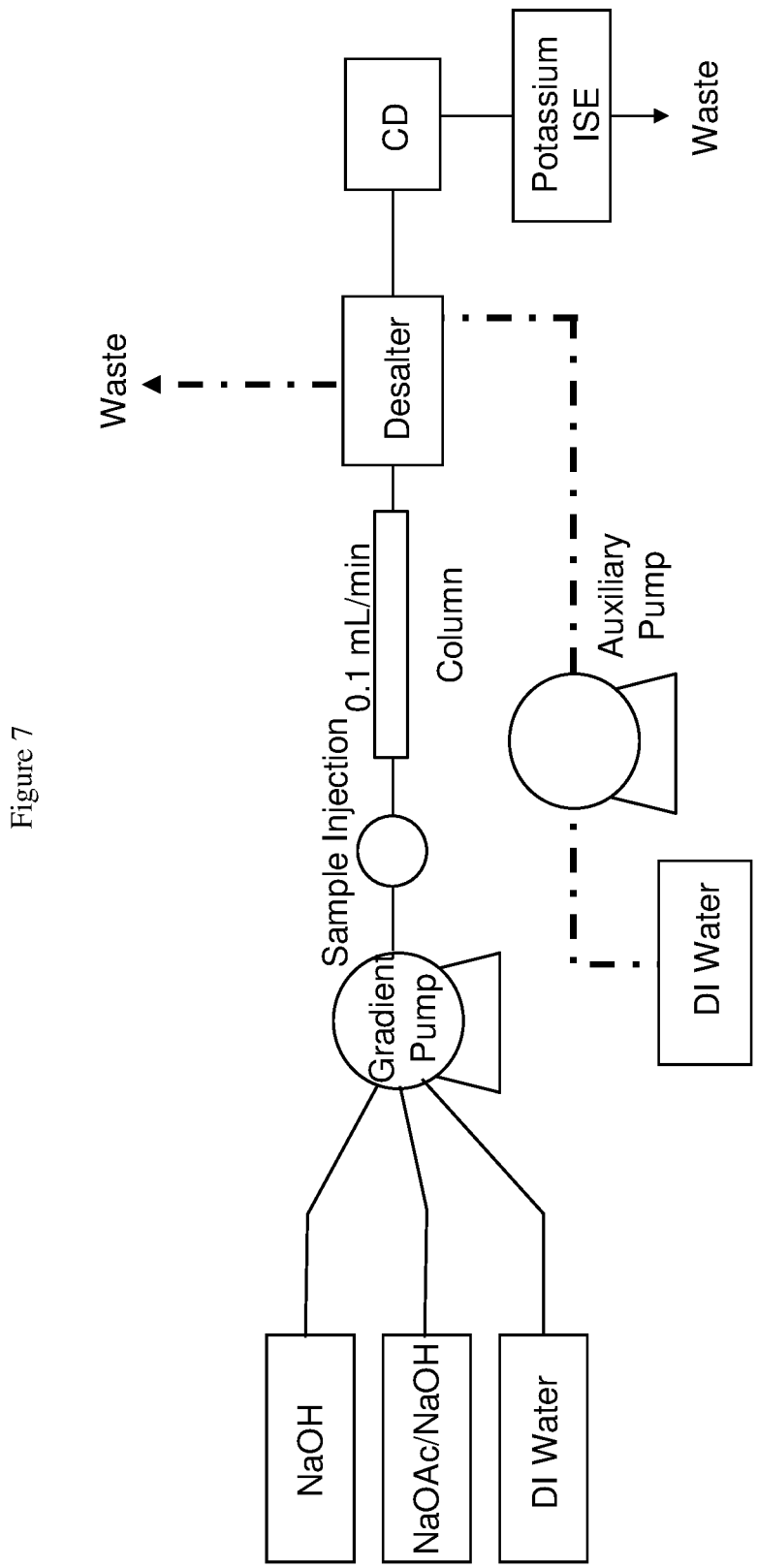
FIG. 7 is a schematic diagram of the system of Example 2.

In some embodiments, the flow is split using a first splitting device, such as a micro-tee at the outlet of the desalter. The first splitting device comprises a first inlet, a first outlet, and a second outlet. The first inlet is fluidly coupled to each of the first outlet and the second outlet, the first inlet also is fluidly coupled to the ion removal device. The first outlet of the splitting device is connected to a cation suppressor followed by a conductivity sensor. In some embodiments, the second outlet of the splitting device is connected to a diverter valve, which is then connected to the MS. The valve is normally open to the MS and normally closed to the flow path to waste (FIG. 7). After the converted eluent, which contains a mixture of acetic acid and alkali acetate, enters the cation suppressor, the acetate ions are exchanged for hydroxide ions, converting the mixture to alkali hydroxide and water. The increase of alkali cation concentration because of a failing desalter can be directly detected against low conductivity background from DI water, by the conductivity sensor. As shown in Example 4, the conductivity before the Dionex CERS cation suppressor doesn't reflect a direct correlation with the varied concentrations of the converted eluent, while the conductivity after the Dionex CERS cation suppressor shows a linear relationship between the sodium concentration and conductivity response. In Example 5, the embodiment was demonstrated in a Thermo Scientific Dionex ICS-6000 system with a desalter, where the conductivity was measured before and after the Dionex CERS 1-mm prototype cation suppressor. This embodiment offers a reliable solution to monitor the amount of alkali cations in the flow, which is a direct indication of the desalting performance.

In some embodiments, to minimize the split flow (e.g. 10 μL/min) from the stream that enters the mass spectrometer, a capillary format of cation suppressor (such as Dionex CCES 300) can be used.

Figure 4:
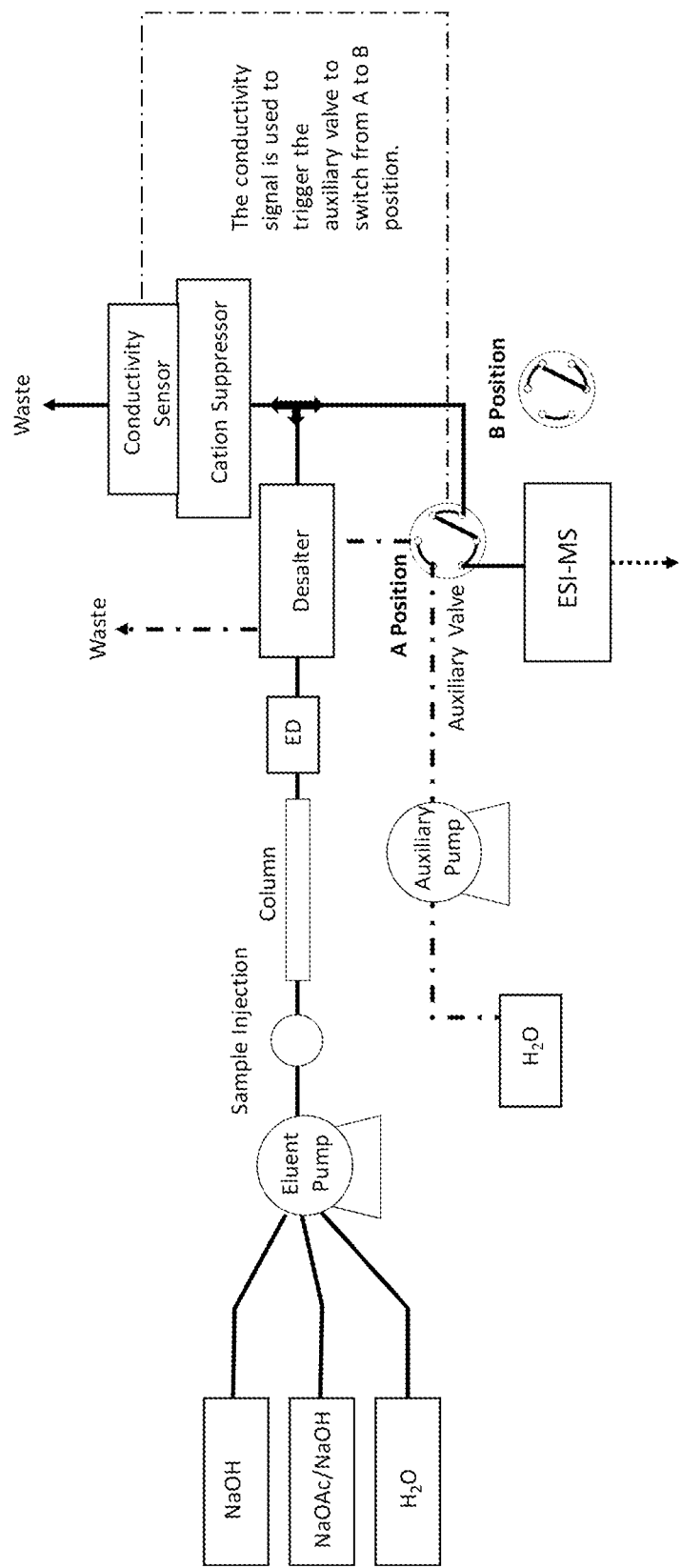
FIG. 4 is a schematic diagram of an embodiment.

In some embodiments, an integrated cation suppressor and conductivity sensor, where the suppressor is equipped with sensor electrodes to detect conductivity, can be used in place of the cation suppressor coupled with the conductivity sensor (FIG. 4). The structure of the integrated cation suppressor and the conductivity sensor can have a similar format to the Dionex Electrolytic pH Modifier (Thermo Fisher Scientific) with an added pair of sensor electrodes placed close to the outlet of the device.

In some embodiments, the analytical system further comprises a second splitting device comprising a second inlet, a third outlet, and a fourth outlet. The second inlet is fluidly coupled to each of the third outlet and the fourth outlet. The second inlet is also fluidly coupled to the output of the chromatography column. The third outlet is fluidly coupled to the ion removal device. The fourth outlet is fluidly coupled to an electrochemical detector. The second splitting device is configured to split the mobile phase inputted into the second inlet so that a third portion of the mobile phase flows to the third outlet and a fourth portion of the mobile phase flows to the fourth outlet.

The method of analyzing a sample with a mass spectrometer and a chromatography system comprises multiple steps. A sample is injected into a chromatography column of the chromatography system. A mobile phase is flowed into the chromatography column to separate the sample into one or more analytes that elute off the chromatography column at different times. The mobile phase is flowed from the chromatography column into an ion removal device. At least ion of one charge are removed from the mobile phase in the ion removal device. After ions are removed in the ion removal device, the mobile phase is split into a first portion and second portion. The first portion is flowed to an ion selective sensor. A signal is measured with the ion selective sensor. The second portion is flowed to a mass spectrometer where the signal from the ion selective sensor is below a predetermined threshold.

In some embodiments, the method further comprises flowing the second portion to a diverter valve; and flowing the second portion from the diverter valve to a mass spectrometer where the signal from the ion selective electrode is below a predetermined threshold.

In some embodiments, the method further comprises determining that the signal from the ion selective sensor is above the predetermined threshold and then stopping the flow of the second portion from the diverter valve to the mass spectrometer. The diverter valve is switched so that the second portion flows from the diverter valve to a waste reservoir.

In some embodiments, the method further comprises determining that the signal from the ion selective sensor is above the predetermined threshold and then stopping the flow of the second portion from passing to the mass spectrometer.

In some embodiments, the method further comprises after the flowing the mobile phase into the chromatography column and before the removing at least ions of one charge in the ion removal device, splitting the mobile phase into a third portion and a fourth portion. The third portion is flowed into an electrochemical detector. One or more analytes is measured in the electrochemical detector. The fourth portion is flowed into the ion removal device.

Where present, all ranges are inclusive and combinable. That is, references to values stated in ranges include every value within that range. For example, a range defined as from 400 to 450 ppm includes 400 ppm and 450 ppm as independent embodiments. Ranges of 400 to 450 ppm and 450 to 500 ppm may be combined to be a range of 400 to 500 ppm.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

The modifier "about" should be considered as disclosing the range defined by the absolute values of the two endpoints. For example, the expression "from about 2 to about 4" also discloses the range "from 2 to 4." When used to modify a single number, the term "about" may refer to plus or minus 10% of the indicated number and includes the indicated number. For example, "about 10%" may indicate a range of 9% to 11%, and "about 1" means from 0.9 to 1.1.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Figure 5:
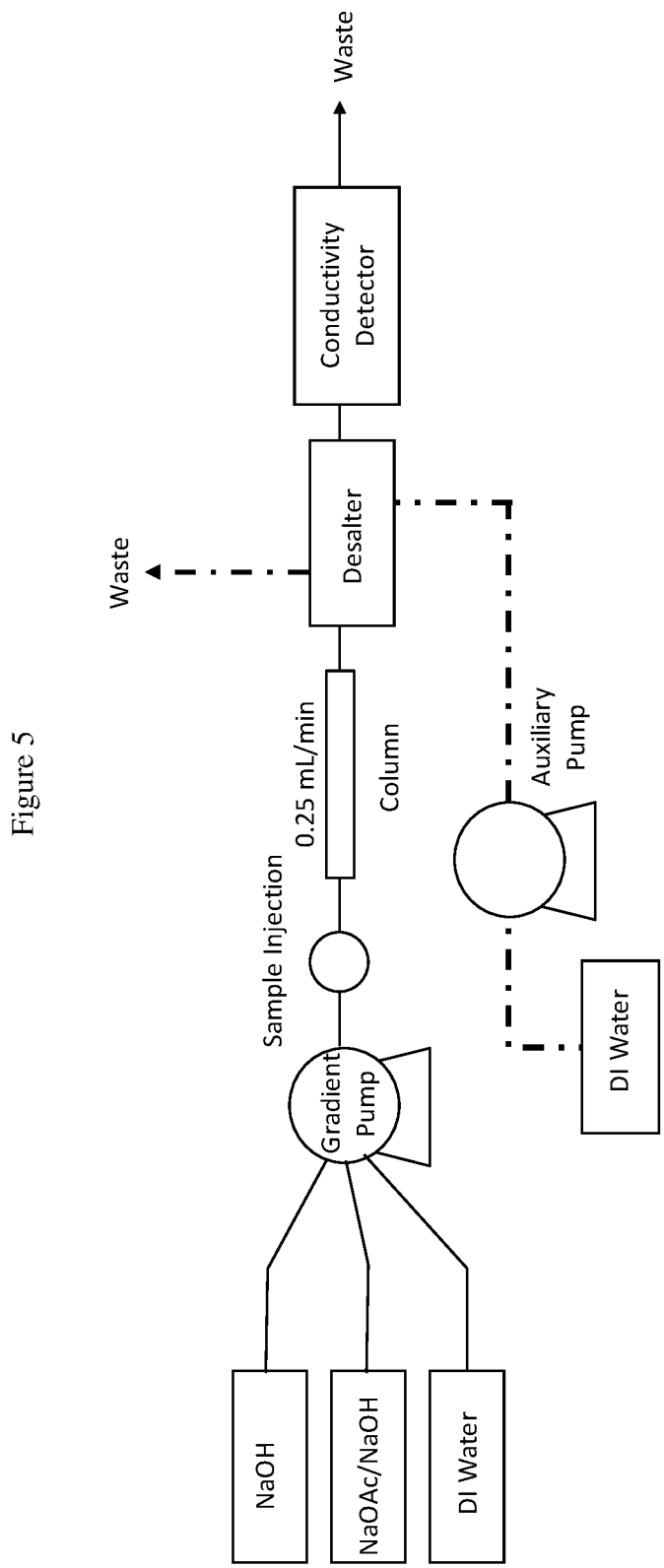
FIG. 5 is a schematic diagram of the system of Example 1.

Example 1: The Use of a Single Conductivity Detector to Monitor the Effluent from the Desalter is not Effective to Indicate the Composition of the Effluent FIG. 5 shows a schematic of a setup for monitoring the conductivity of the effluent of the desalter. After the desalter, the eluent of sodium acetate (NaOAc) and sodium hydroxide (NaOH) is converted to acetic acid (HOAc) and sodium acetate (NaOAc) mixture. The eluent of varied concentrations was pumped through the system at 0.25 mL/min. After the eluent was desalted, the conductivity was measured in Conductivity Detector (CD). In this experiment, a Dionex ERD 500 2-mm device was used as the desalter. A properly operated Dionex ERD 500 will exchange >=99.5% of the sodium ions present (up to 0.35 M), according to the manual.

For the simplicity of the calculation, a 99% desalting efficiency was used to derive the composition of the desalter effluent. The corresponding conductivity of the effluent was calculated using the effluent concentration, the acetic acid dissociation constant ($K_a$), and the limiting equivalent conductivity values of sodium, hydrogen, and acetate ions. The results are shown in Table 1. The conductivity readings collected through the conductivity detector are shown for comparison. The measured values are reasonably close to the calculated values. The conductivity values appear to be associated with the eluent concentration, i.e. the higher the conductivity, the higher the eluent concentration.

TABLE 1

Conductivity readings of eluent at varied concentrations with desalting efficiencies at 99%. The results are confirmed with both calculation and experimental data

| Eluent Composition before desalter | | Eluent Composition calculated based on 99% desalting efficiency | | Calculated Conductivity Based on 99% Desalting Efficiency | Measured (Conductivity Detector Reading) |
| --- | --- | --- | --- | --- | --- |
| NaOAc (mM) | NaOH (mM) | HOAc (mM) | NaOAc (mM) | | |
| 50 | 100 | 48.50 | 1.50 | 310.18 | 310.87 |
| 100 | 100 | 98.00 | 2.00 | 439.32 | 436.00 |
| 150 | 100 | 147.50 | 2.50 | 539.95 | 529.00 |
| 200 | 100 | 197.00 | 3.00 | 626.04 | 608.00 |
| 250 | 100 | 246.50 | 3.50 | 703.23 | 681.00 |

Figure 6:
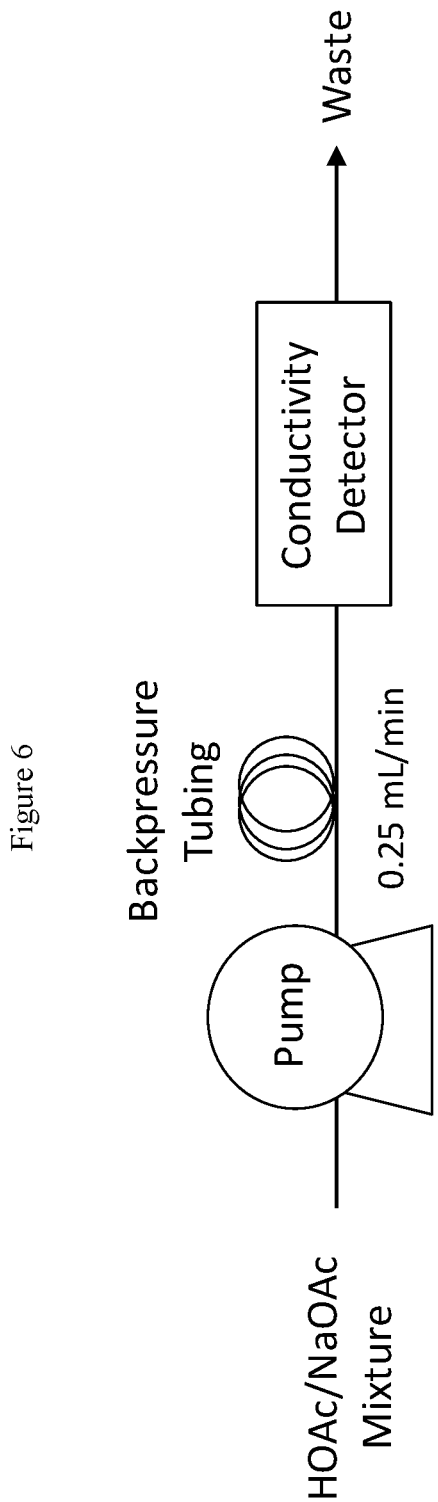
FIG. 6 is a schematic diagram of the system of Example 1 for testing conductivity readings.

At a given NaOAc/NaOH eluent concentration, the composition of the HOAc/NaOAc mixture depends on the desalting efficiency. The lower the desalting efficiency, the higher the concentration of the sodium ions in the HOAc/NaOAc mixture. A series of HOAc/NaOAc solutions were prepared based on the calculation of an eluent composition at certain selected sodium concentrations (assuming we select 5 mM sodium concentration as a threshold to divert the flow away from the MS). The series of HOAc/NaOAc solutions were pumped into a conductivity detector using the setup shown in the schematic of FIG. 6.

In Table 2, the measured conductivity values are compared with the conductivity values calculated based on the effluent concentration, the acetic acid dissociation constant ($K_a$), and the limiting equivalent conductivity. The desalting efficiency based on the calculation is also shown in Table 2. The deviation of the measured value from the calculated value can be explained by the fact that the calculation was based on limiting equivalent conductivity at infinite dilution while the concentration of the eluent is above 100 mM. If the CD reading of 700-800 μS (corresponding to the conductivity of the fully suppressed 250 mM NaOAc/100 mM NaOH shown in Table 1, an eluent condition often employed for column wash at the end of a separation) is the threshold to divert the flow (any CD reading below this value will be recognized by the system as the indication that the desalter functions properly), a reading of 400-500 μS (approximately corresponding to 5 mM sodium ions from 50 mM NaOAc/100 mM NaOH or 100 mM NaOAc/100 mM NaOH eluent under compromised suppressed condition shown in Table 2) will not be recognized by the system as an indication of the desalter starting to fail. Because of the presence of acetic acid at varied concentration in the desalter effluent, for a given sodium concentration (e.g. 5 mM), the conductivity reading of the desalter effluent can vary significantly as shown in Table 2. Since NaOAc/NaOH eluent gradient of varied concentration and slope are typically employed in oligosaccharides separation using HPAE, it's not viable to use the conductivity of the desalter effluent as a direct indication for the status of the desalter to the switching of the diverter valve. No clear correlation between the ΔCD and the solution composition was found either.

Figure 8:
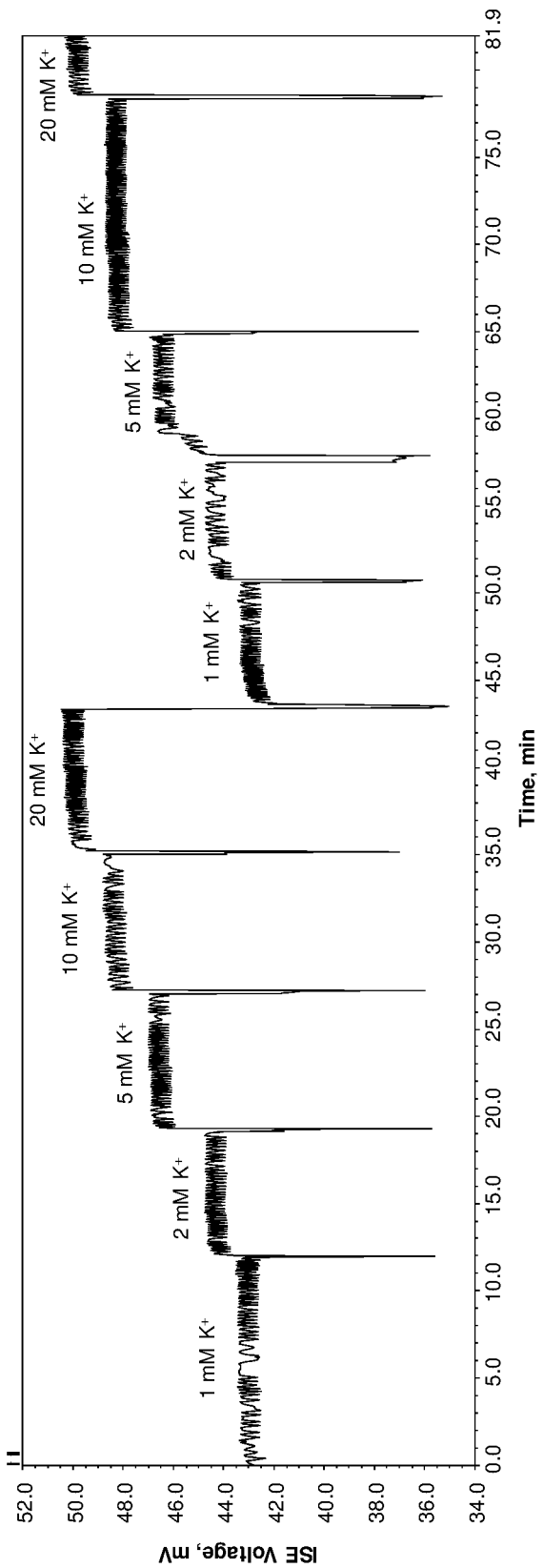
FIG. 8 is the calibration of the potassium ISE using calibration standards: 1, 2, 5, 10, and 20 mM potassium acetate for Example 2.
Figure 9:
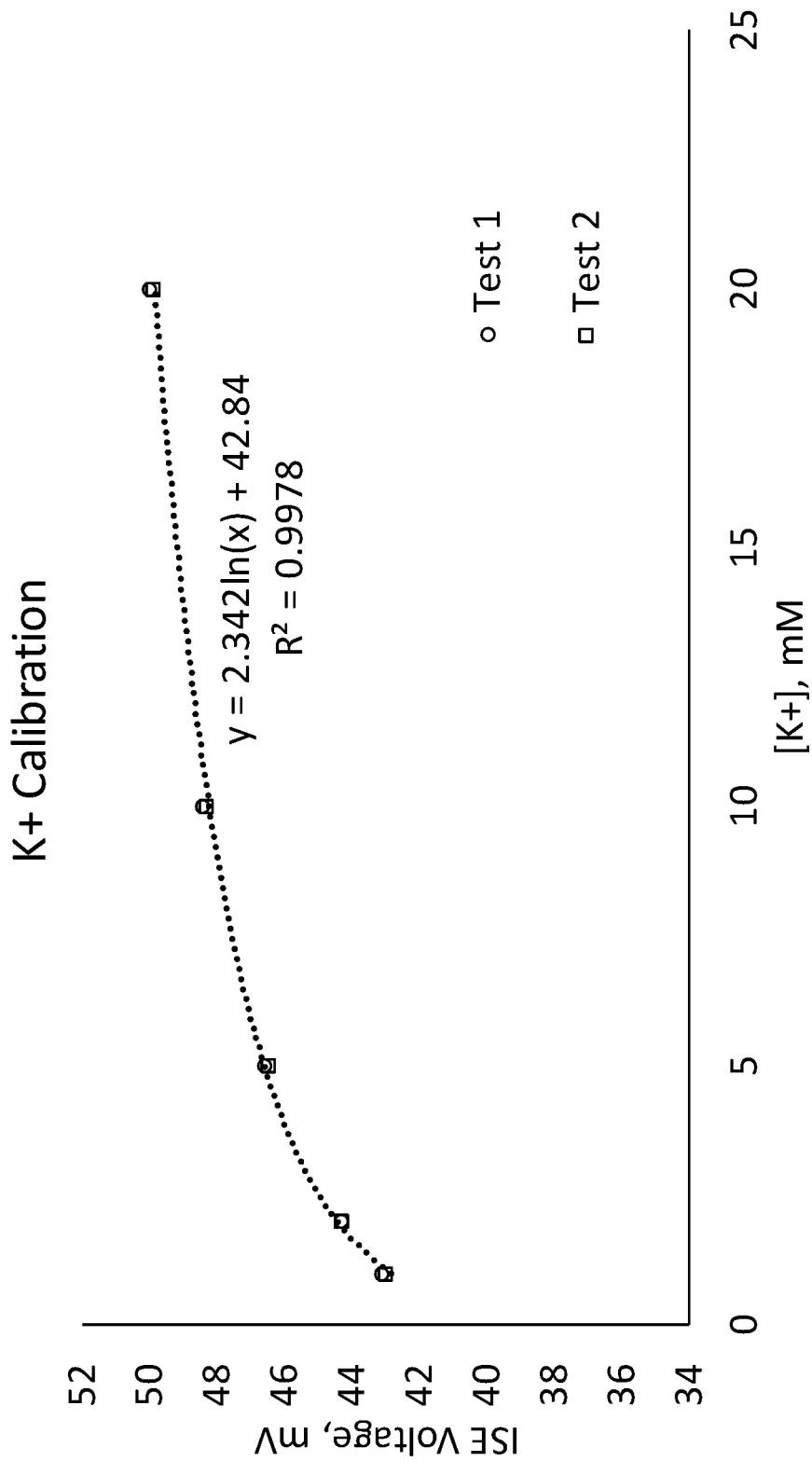
FIG. 9 is a graph of the relationship between the ISE voltage and the potassium concentration of Example 2.
Figure 10:
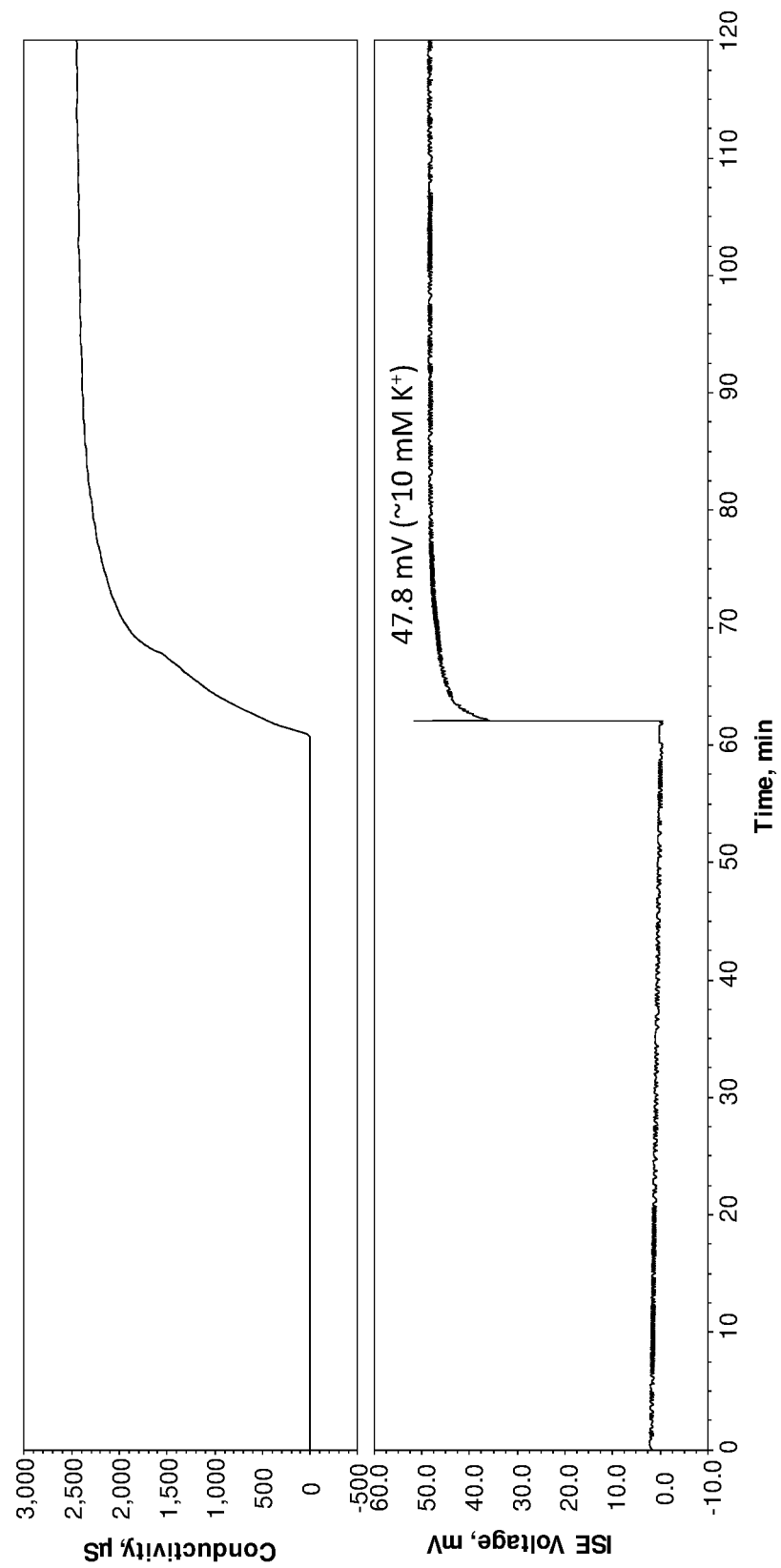
FIG. 10 is a graph of the ISE Voltage and conductivity when the desalter was turned off for a run using 10 mM KOH.
Figure 11:
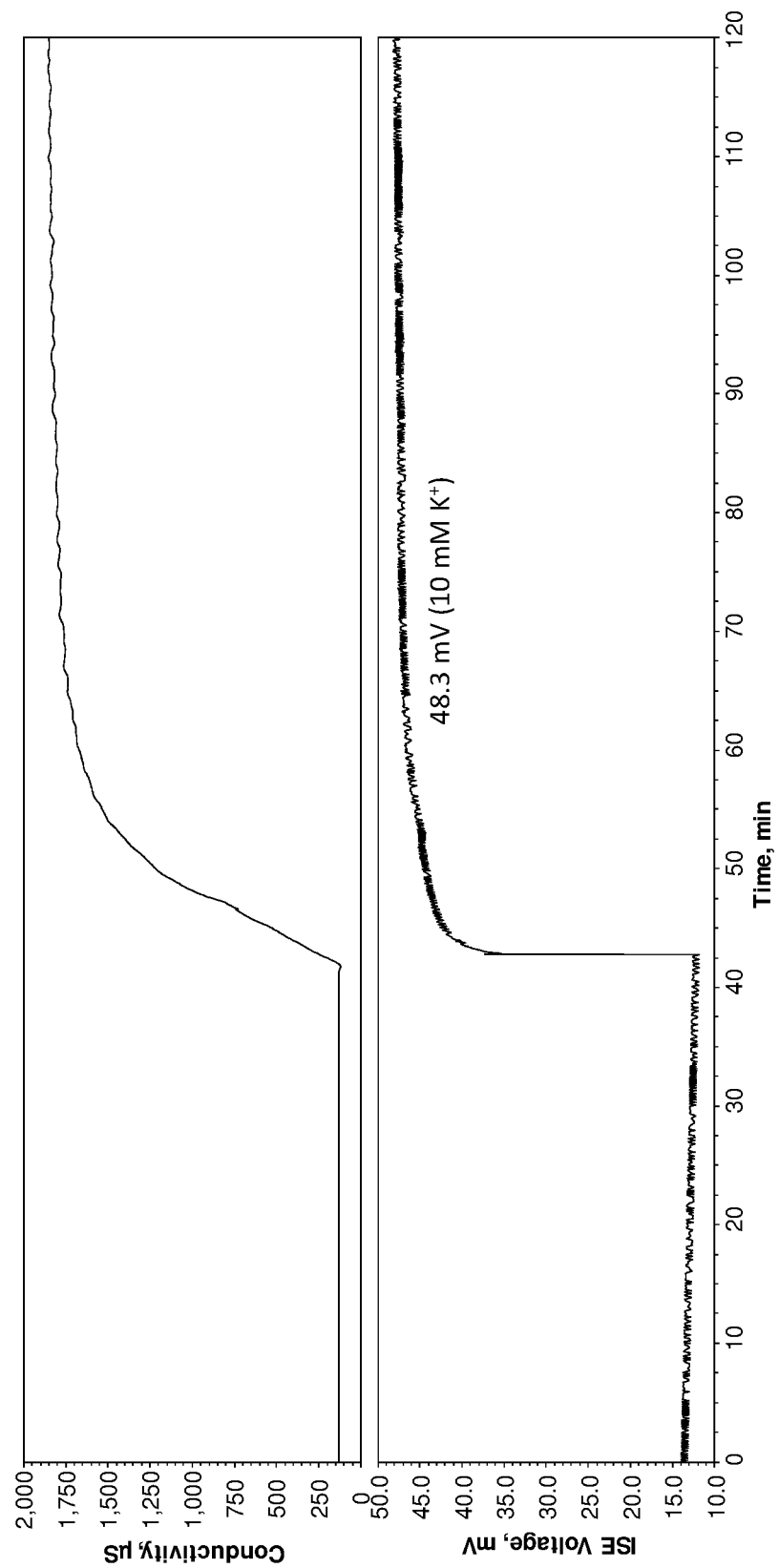
FIG. 11 is a graph of the ISE Voltage and conductivity when the desalter was turned off for a run using 5 mM KOH/5 mM KOAc

2-mm. The potential output of the potassium ISE was recorded in Dionex Chromeleon 7 via a Dionex UCI-100 Interface. The calibration of the potassium ISE was conducted in specimen cups and the electrode output was recorded (FIG. 8). The dip between every two plateaus is the interval between the two calibration solutions. In this example, the eluent of known concentration was pumped through the system with the proper current applied to the desalter. A graph of the relationship between the ISE voltage and the potassium concentration is shown in FIG. 9. During runs using 10 mM KOH and 5 mM mM KOH/5 mM KOAc, the desalter was turned off (the current was turned off) which are shown in FIGS. 10 and 11, respectively. The conductivity detector and the potassium ISE were used to monitor the effluent of the desalter. The purpose of the conductivity detector in this experiment was to provide a reference for the response time of the potassium ISE.

Example 3: The pH Sensor Effectively Discerns the Change of Desalting Efficiency of the Desalter The concentration of simulated desalter effluent, which is a mixture of HOAc/NaOAc solution, was calculated based on the varied desalting efficiencies of 200 mM NaOAc/100 mM NaOH eluent. The solutions were prepared in specimen cups and measured with a pH electrode. The pH of the simulated desalter effluent was also calculated from the concentration and the acetic acid dissociation constant ($K_a$). The calculated pH is compared to the measured pH in Table 3.

TABLE 2

Conductivity readings of eluent at varied concentrations, with 5 mM and 10 mM sodium concentration as the set threshold to switch divert the effluent of desalter away from the MS

| Eluent Composition before desalter | | Desalter Effluent Composition Calculated Based on Selected Sodium Concentration | | Desalting Efficiency Calculated Based on Selected Sodium Concentration (%) | Conductivity Calculated Based on Selected Sodium Concentration (μS) | Measured (Conductivity Detector Reading) | Difference in Calculated Conductivity ΔCD = CD(at 99% efficiency) - CD(at selected sodium concentration) (μS) |
|---|---|---|---|---|---|---|---|
| NaOAc (mM) | NaOH (mM) | HOAc (mM) | NaOAc (mM) | | | | |
| 50 | 100 | 45 | 5 | 96.77 | 518.24 | 448.88 | 167.6 |
| 100 | 100 | 95 | 5 | 97.67 | 588.47 | 500.68 | 89.2 |
| 200 | 100 | 195 | 5 | 98.57 | 729.07 | 603.86 | 20.78 |
| 250 | 100 | 245 | 5 | 98.82 | 799.37 | 648.52 | 6.5 |

Example 2: The Potassium Ion Selective Electrode (ISE) Effectively Detects the Potassium Ions Present in the Effluent of the Desalter Mixtures of potassium hydroxide (KOH) and potassium acetate (KOAc) of varied concentrations were pumped through the system shown in FIG. 7, with the potassium ISE housed in a flow cell, which was placed at the outlet of the conductivity detector. The desalter was Dionex ERD 500

TABLE 3 pH value of converted eluent (simulated desalter effluent) at varied desalting efficiencies. Eluent before desalter: 200 mM NaOAc/100 mM NaOH

| Desalting Efficiency (%) | HOAc (mM) | NaOAc (mM) | Calculated pH* | Measured pH |
|---|---|---|---|---|
| 100 | 200 | 0 | 2.73 | 2.53 |
| 99.95 | 199.85 | 0.15 | 2.74 | 2.59 |
| 99.9 | 199.7 | 0.3 | 2.76 | 2.60 |

TABLE 3-continued pH value of converted eluent (simulated desalter effluent) at varied desalting efficiencies. Eluent before desalter: 200 mM NaOAc/100 mM NaOH

| Desalting Efficiency (%) | HOAc (mM) | NaOAc (mM) | Calculated pH* | Measured pH |
|---|---|---|---|---|
| 99.8 | 199.4 | 0.6 | 2.79 | 2.63 |
| 99.5 | 198.5 | 1.5 | 2.89 | 2.69 |
| 99 | 197 | 3 | 3.04 | 2.75 |
| 98 | 194 | 6 | 3.27 | 3.05 |
| 95 | 185 | 15 | 3.66 | 3.36 |

*The calculation doesn't take into account of the influence of ionic strength on ion activity.

Example 4

Figure 12:
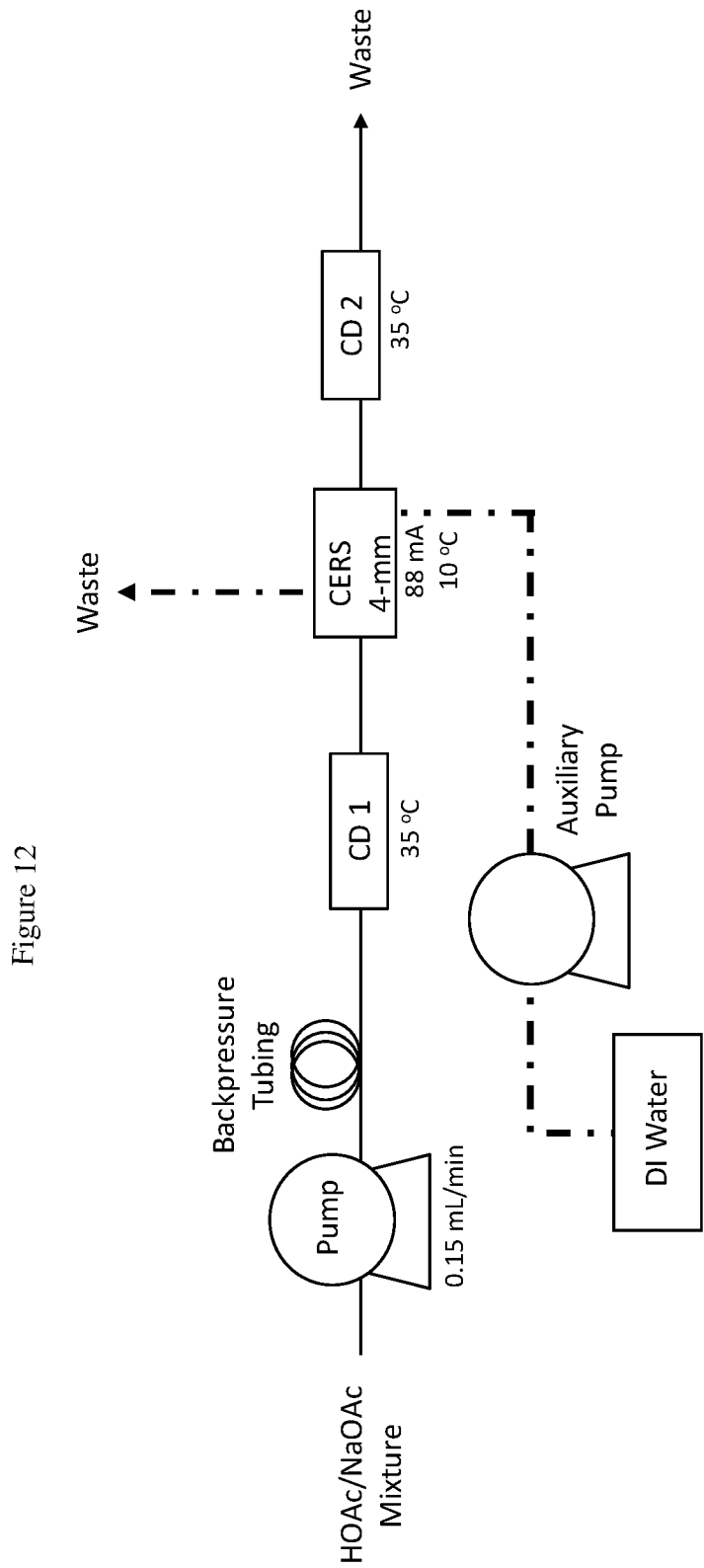
FIG. 12 is a schematic diagram of the system of Example 4.

The conductivity reading of the desalter effluent doesn't show a correlation with the amount of sodium ions present in the effluent. The response from the conductivity detector placed after the cation suppressor shows a linear correlation with the sodium concentration in the effluent of the desalter The simulated desalter effluents (mixtures of HOAc/NaOAc) of the eluent at a concentrations of 200 mM NaOAc/100 mM NaOH were prepared and pumped through a first conductivity detector (CD1), followed by a cation suppressor (Dionex CERS 4-mm) and a second conductivity detector (CD2), as shown in the schematic of FIG. 12. In the Dionex CERS suppressor, the acetate ions ($OAc^-$) were exchanged for electrolytic generated hydroxide ions ($OH^-$), converting HOAc to water ($H_2O$) with low conductivity background. This allows selective detection of sodium concentration in the eluent of high salt concentrations.

Figure 13:
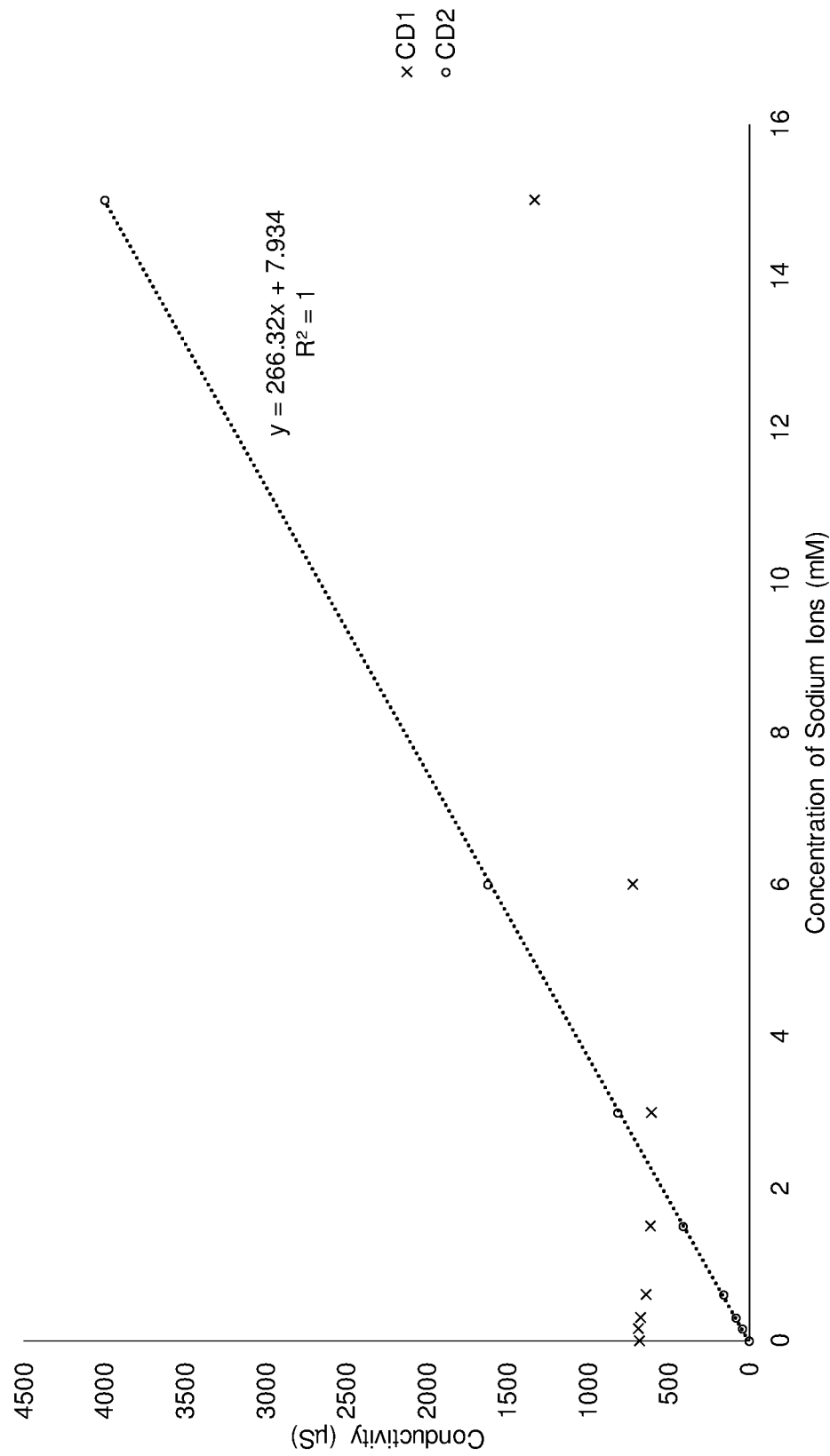
FIG. 13 is a graph of the conductivity measured before and after the cation suppressor of Example 4.

As shown in FIG. 13 and table 4, the response from CD2 is linearly related to the sodium concentration in the mixture, while the response of CD1 shows no clear correlation to the sodium concentration. Therefore, CD2 provides effective indication of the sodium concentration in the desalter effluent.

TABLE 3 pH value of converted eluent (simulated desalter effluent) at varied desalting efficiencies. Eluent before desalter: 200 mM NaOAc/100 mM NaOH

| Desalting Efficiency (%) | HOAc (mM) | NaOAc (mM) | Measured conductivity before CERS (μS) | Measured conductivity after CERS (μS) | Calculated conductivity (μS) after CERS |
|---|---|---|---|---|---|
| 100 | 200 | 0 | 687.91 | 0.32 | 0 |
| 99.95 | 199.85 | 0.15 | 693.8 | 40.9 | 37.212 |
| 99.9 | 199.7 | 0.3 | 679.496 | 83.04 | 74.424 |
| 99.8 | 199.4 | 0.6 | 643.26 | 163.91 | 148.848 |
| 99.5 | 198.5 | 1.5 | 617.62 | 411.25 | 372.12 |
| 99 | 197 | 3 | 612.1642 | 819.69 | 744.24 |
| 98 | 194 | 6 | 729.005 | 1621.2 | 1488.48 |
| 95 | 185 | 15 | 1335.26 | 3994 | 3721.2 |

Figure 14:
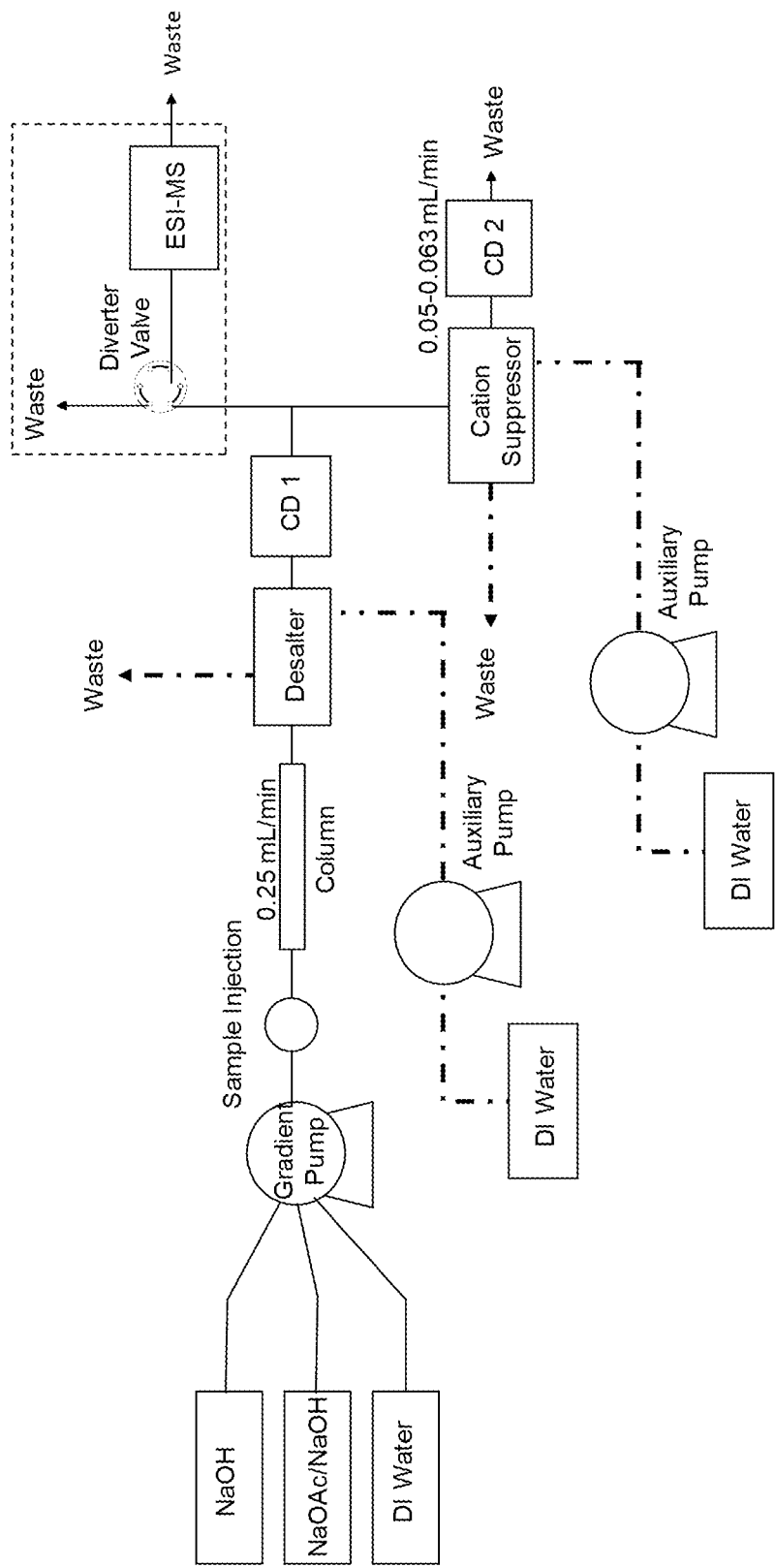
FIG. 14 is a schematic diagram of the system of Example 5.

Example 5: The Cation Suppressor Coupled with a Conductivity Sensor Effectively Detects the Sodium Ions Present in the Effluent of the Desalter This example simulates the failure of the desalter. NaOAc/NaOH eluent of varied concentrations was pumped through the HPAE system, with the desalter (Dionex ERD 500 2-mm) current OFF and the cation suppressor (Dionex CERS 500 1-mm prototype) with proper suppressor current applied. The flow rate through the desalter (Dionex ERD 500 2-mm) was 0.25 mL/min. The flow rate through the cation suppressor (Dionex CERS 500 1-mm prototype) was 0.05-0.063 mL/min. The regenerant flow rate for the cation suppressor was 0.1-0.13 mL/min. The current applied to the Dionex CERS 500 1-mm prototype was 15 mA. As the desalter was not turned on, the concentration of sodium ions through the desalter and the cation suppressor was known. The dotted rectangle in schematic of the setup (FIG. 14) shows where the diverter valve and the mass spectrometer will be located relative to the current experimental setup. The Conductivity Detector 1 (CD1) was placed in the system to show that the conductivity of the desalter effluent is not effective to indicate the sodium concentration in the effluent. The CD2 response was plotted against sodium concentration to show a linear correlation.

Figure 15:
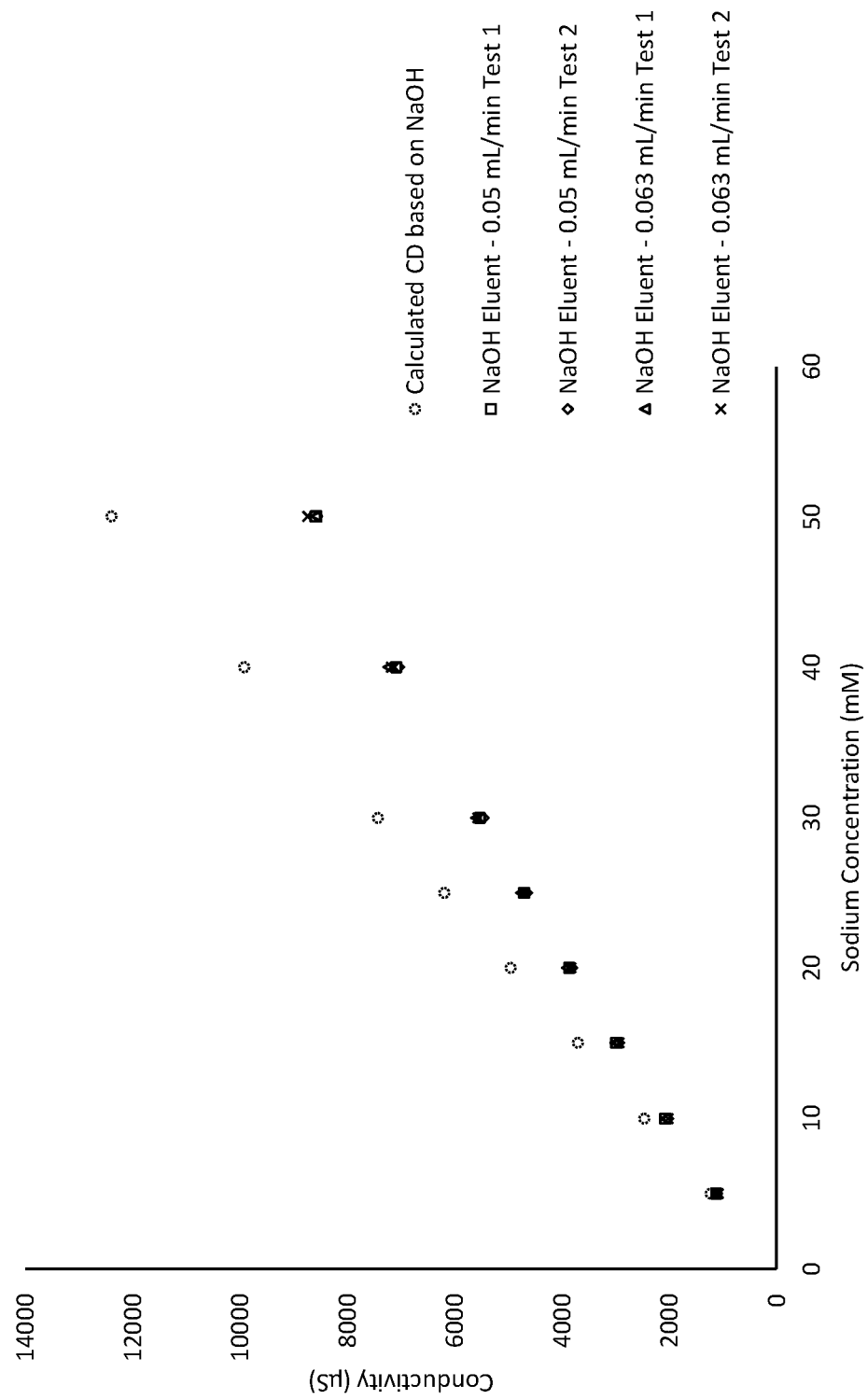
FIG. 15 is a plot of the conductivity plotted against the sodium concentration from NaOH eluents for Example 5.
Figure 16:
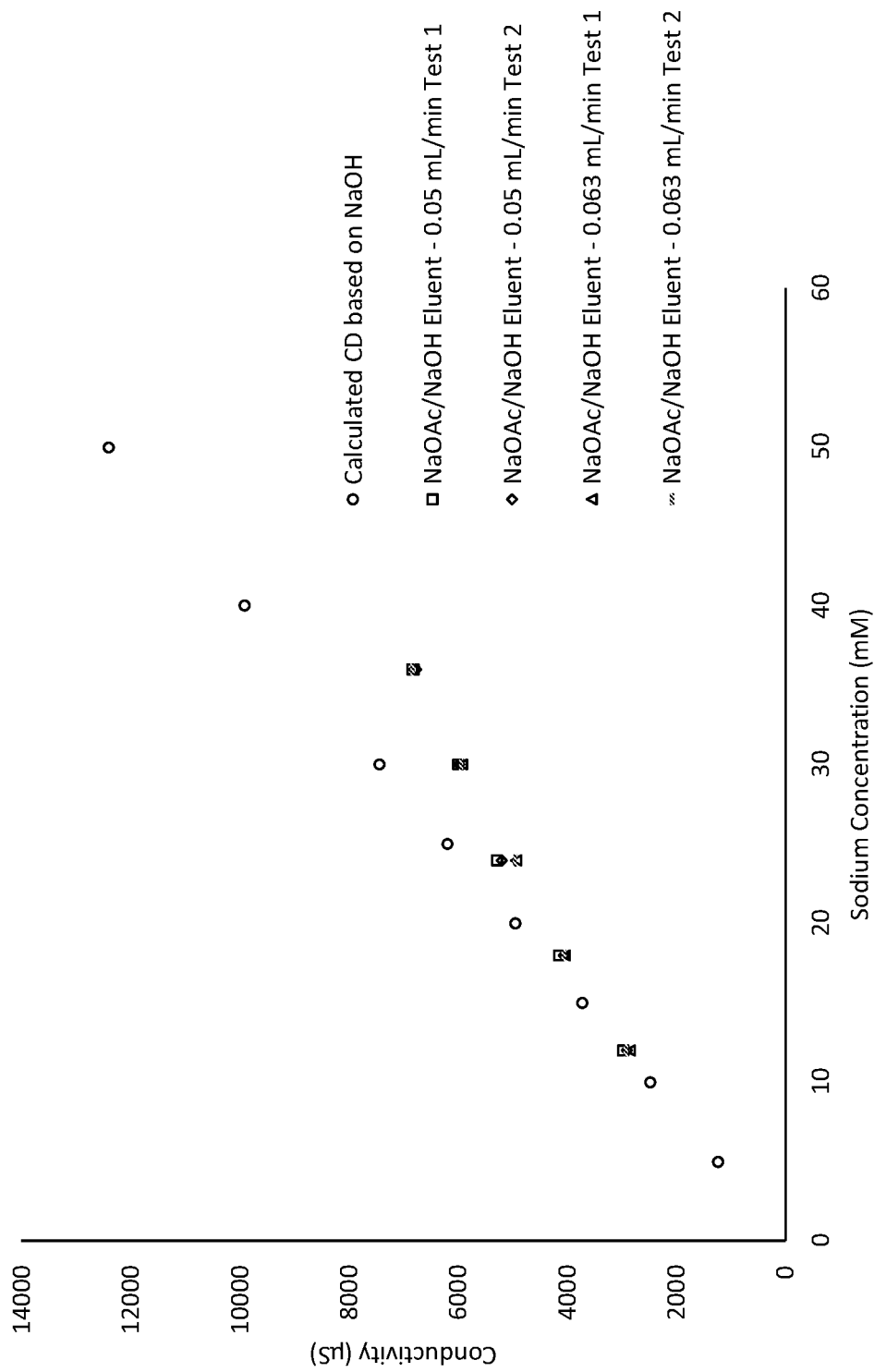
FIG. 16 is a plot of the conductivity plotted against the sodium concentration from NaOAc/NaOH eluents for Example 5

This example examines the sodium concentration in both the sodium hydroxide (NaOH) eluents and sodium acetate (NaOAc)/NaOH eluents. The conductivity of the NaOH solutions with 5-50 mM sodium concentration was calculated and plotted in FIGS. 15 and 16 as a theoretical value for reference. The measured conductivity of the eluents in both CD1 and CD2 are reported in Table 4. The measured conductivity from CD2 at varied eluent concentration is plotted in FIGS. 15 and 16. As shown in FIGS. 15 and 16, the curve of the CD2 experimental data is linear, with the curve deviating from the theoretical curve as the sodium concentration increases. The deviation can be explained by the fact that the theoretical conductivity was based on the sum of the limiting equivalent conductivity ions, which is the equivalent conductivity of an electrolyte at infinite dilution of the solution (Kohlrausch's Law). The deviation is caused by the high concentration of the sodium. When it comes to setting the threshold for the sodium concentration, the concentration will fall within the linear range of the curves, therefore the deviation doesn't affect the effectiveness of the method. This experiment demonstrates that the use of a cation suppressor coupled with a conductivity detector offers an effective measurement of the sodium concentration in the desalter effluent. It can be used to monitor the status of the desalter. FIGS. 15 and 16 shows the conductivity plotted against the sodium concentration in (A) NaOH eluents and (B) NaOAc/NaOH eluents, showing a linear relationship. The dotted circles represent the theoretical values calculated based on equivalent conductance of 5-10 mM NaOH. Two flow rates, 0.05 and 0.063 mL/min, were tested on different days to confirm the result. Table 5 shows the data used to construct the plots in FIGS. 15 and 16, demonstrating day-to-day consistency of the measurements and the minimal effect of the flow rate (0.5 mL/min vs 0.063 mL/min) on the conductivity signal. To set 5 mM sodium concentration as the threshold, approximately 1200 μS can be used to trigger the diverter valve switching.

FIG. 17a is a plot of the response time of the conductivity detector sensing the sodium concentration. Eluent concentration: (A) 100 mM NaOAc/100 mM NaOH (B) 200 mM NaOAc/100 mM NaOH. Eluent flow rate through the desalter (Dionex ERD 500 2-mm): 0.25 mL/min; flow rate through the cation suppressor (prototype Dionex CERS 1-mm): 0.05 mL/min. Dionex ERD 500 2-mm current: 150 mA; prototype Dionex CERS 1-mm current 18 mA; Regen flow rate for Dionex ERD 500 2-mm: 1.5 mL/min; regen flow rate for prototype Dionex CERS 1-mm: 0.1 mL/min. Solid trace: CD2; dotted trace: CD1.

Figure 17:
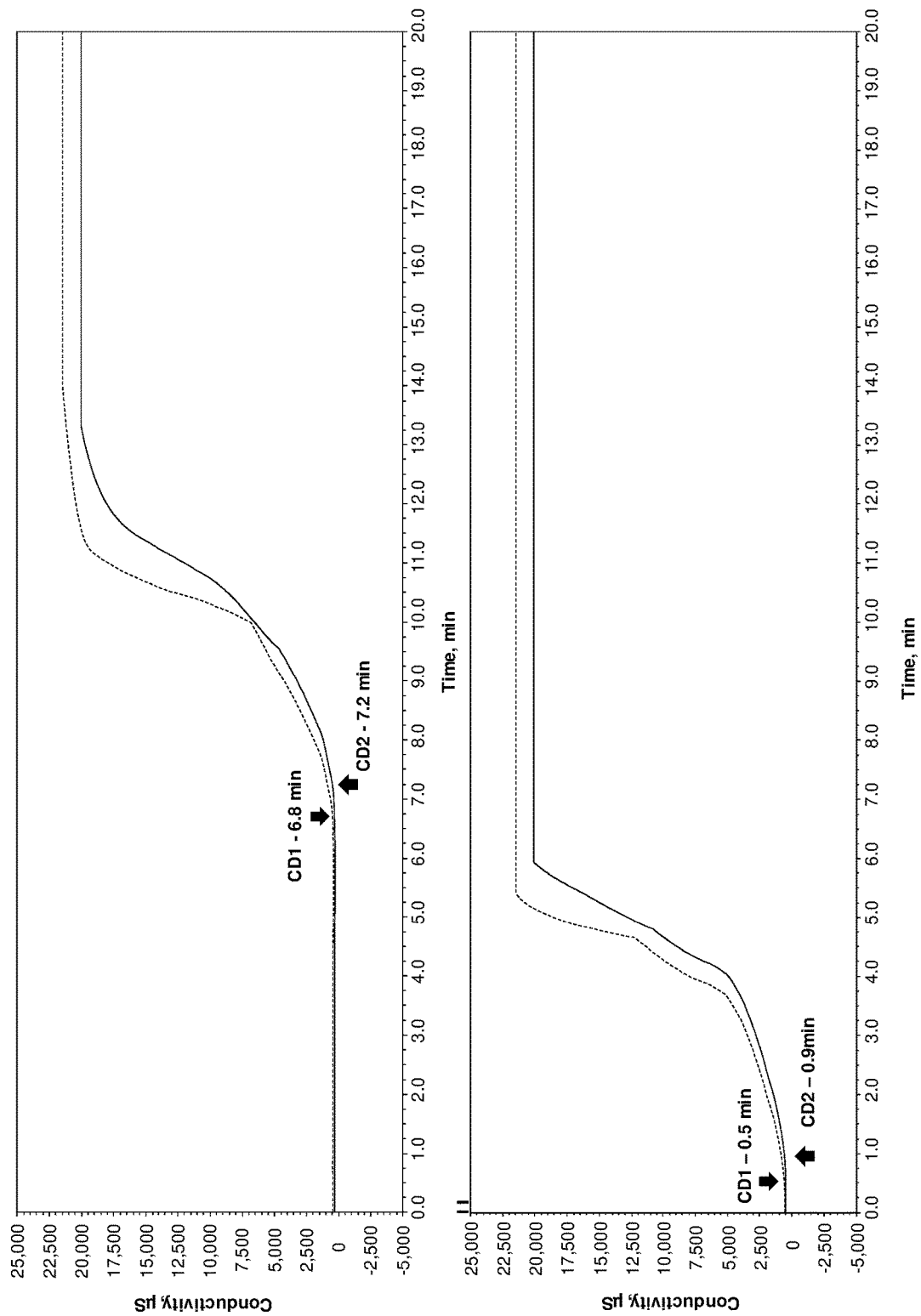
FIG. 17 is a plot of the response time of the conductivity detector sensing the sodium concentration for Example 5.

To evaluate the response time of the conductivity sensing (CD2) of the sodium concentration change, the signals of CD1 and CD2 are overlaid in FIG. 17. In this example, two eluent concentration conditions (A) 100 mM NaOAc/100 mM NaOH and (B) 200 mM NaOAc/100 mM NaOH were tested. They were run first with proper desalter and cation suppressor currents. Then as shown in FIG. 17, the desalter current was turned off at 0 min of the run. As hydronium ions ran out as a result of no self-regeneration (zero current applied), the conductivity eluent increased. The change of the conductivity before (CD1) and after (CD2) the cation suppressor was recorded. The CD1 signal was used as a reference to evaluate the response time of CD2. Despite the physical distance between the two detectors. The difference between the rise time of CD1 and CD2 are approximately 0.4 min in both conditions, indicating effective practical sensing of the sodium concentration.

TABLE 5

Measured conductivity readings before and after the cation suppressor respectively.

| | | Test Regin Flow Rate through CERS 1-mm (mL/min) | | | |
|---|---|---|---|---|---|
| Eluent | Na conc. (mM) | Calculated CD2 (µS) | Test 1 0.1 | Test 2 0.1 | Test 3 0.13 | Test4 0.13 |
| | | | Measured CD2 (µS) | | | |
| 5 mM NaOH | 5 | 1240.4 | 1132 | 1117.1 | 1130.1 | 1100.7 |
| 10 mM NaOH | 10 | 2480.8 | 2076.8 | 2029.5 | 2083.5 | 2023 |
| 15 mM NaOH | 15 | 3721.2 | 2996.2 | 2946.1 | 3022.4 | 2950.7 |
| 20 mM NaOH | 20 | 4961.6 | 3870.5 | 3816.3 | 3916 | 3844.4 |
| 25 mM NaOH | 25 | 6202 | 4718.3 | 4658.4 | 4778.7 | 4712 |
| 30 mM NaOH | 30 | 7442.4 | 5533.4 | 5477.7 | 5615.4 | 5576.9 |
| 40 mM NaOH | 40 | 9923.2 | 7100.4 | 7049.5 | 7237 | 7194.7 |
| 50 mM NaOH | 50 | 12404 | 8600.3 | 8558.1 | 8579.3 | 8737.4 |
| 10 mM NaOAc/ 2 mM NaOH | 12 | | 2982.1 | 2915 | 2853 | 2924 |
| 15 mM NaOAc/ 3 mM NaOH | 18 | | 4154.2 | 4059 | 4052.7 | 4074.4 |
| 20 mM NaOAc/ 4 mM NaOH | 24 | | 5299.1 | 5199.9 | 4944.4 | 4960 |
| 25 mM NaOAc/ 5 mM NaOH | 30 | | 6002 | 5989 | 5932 | 5950.2 |
| 30 mM NaOAc/ 6 mM NaOH | 36 | | 6846 | 6775 | 6823.9 | 6833 |

What is claimed is:

1. An analytical system comprising:
   a) a pump configured to pump a mobile phase;
   b) an injection valve configured to input a sample into the mobile phase, the injection valve is fluidly coupled to an output of the pump;
   c) a chromatography column configured to separate the sample into one or more analytes, the chromatography column fluidly coupled to an output of the injection valve;
   d) an ion removal device configured to remove at least ions of one charge from the mobile phase, the ion removal device fluidly coupled to an output of the chromatography column;
   e) an ion selective sensor configured to measure a signal corresponding to an activity of the at least ions of one charge in the mobile phase, the ion selective sensor fluidly coupled to an output of the ion removal device;
   f) an optional diverter valve that can interrupt a flow of the mobile phase; and
   g) a microprocessor configured to monitor the signal of the ion selective sensor and when the signal is greater than a predetermined threshold to either switch the optional diverter valve to interrupt the flow of the mobile phase or turn off the pump.

2. The analytical system of claim 1, further comprising:
   h) a first splitting device comprising a first inlet, a first outlet, and a second outlet,
   wherein the first inlet is fluidly coupled to each of the first outlet and the second outlet, the first inlet also is fluidly coupled to the ion removal device so that the mobile phase flows from the ion removal device to the first inlet, the first outlet is fluidly coupled to an input of the ion selective sensor so that the mobile phase flows from the first outlet to the input of the ion selective sensor;
   wherein the first splitting device is configured to split the mobile phase inputted into the first inlet from the ion removal device so that a first portion of the mobile phase flows to the first outlet and a second portion of the mobile phase flows to the second outlet.

3. The analytical system of claim 2, wherein the analytical system comprises the diverter valve that can interrupt the flow of the mobile phase, wherein the diverter valve has a first valve inlet, a first valve outlet, and
   a second valve outlet; the diverter valve having a first state and a second state;
      wherein the first valve inlet is fluidly coupled to the first valve outlet and not fluidly coupled to the second valve outlet in the first state;
      wherein the first valve inlet is fluidly coupled to the second valve outlet and not fluidly coupled to the first valve outlet in the second state.

4. The analytical system of claim 3, wherein the second outlet of the first splitting device is fluidly coupled to the first valve inlet of the diverter valve.

5. The analytical system of claim 4, wherein either the first or second valve outlet of the diverter valve is fluidly connected to a mass spectrometer.

6. The analytical system of claim 1, wherein the at least ions of one charge is selected from the group consisting of lithium, sodium, potassium, cesium, and rubidium.

7. The analytical system of claim 1, wherein the ion selective sensor comprises a solid state electrode and the ion selective sensor does not leach an ion exchange reagent.

8. The analytical system of claim 1 further comprising an ion selective flow cell, the ion selective flow cell having a flow cell inlet and a flow cell outlet, the ion selective flow cell containing the ion selective sensor, the flow cell inlet fluidly coupled to the output of the ion removal device.

9. The analytical system of claim 2, wherein the ion selective sensor is a hydronium electrode and the signal corresponds to a pH value, wherein the predetermined threshold is selected from a pH value between the range of 2-4.

10. The analytical system of claim 2, wherein the ion selective sensor is a potassium electrode and the signal corresponds to a potassium activity value, wherein the predetermined threshold corresponds to the potassium activity value of 1.75 mM.

11. The analytical system of claim 1, wherein the ion selective sensor comprises a cation suppressor and a conductivity sensor, wherein the cation suppressor has an output and wherein the conductivity sensor has an input, wherein the output of the cation suppressor is fluidly coupled with the input of the conductivity sensor.

12. The analytical system of claim 1 further comprising:
i) a second splitting device comprising a second inlet, a third outlet, and a fourth outlet,
   wherein the second inlet is fluidly coupled to each of the third outlet and the fourth outlet, the second inlet is also fluidly coupled to the output of the chromatography column, the third outlet is fluidly coupled to the ion removal device, and the fourth outlet is fluidly coupled to an electrochemical detector;
   wherein the second splitting device is configured to split the mobile phase inputted into the second inlet so that a third portion of the mobile phase flows to the third outlet and a fourth portion of the mobile phase flows to the fourth outlet.

* * * * *